United States Patent
Kim et al.

(10) Patent No.: US 10,831,916 B2
(45) Date of Patent: Nov. 10, 2020

(54) METHOD FOR BLOCKING ACCESS OF MALICIOUS APPLICATION AND STORAGE DEVICE IMPLEMENTING THE SAME

(71) Applicant: SOGANG UNIVERSITY RESEARCH FOUNDATION, Seoul (KR)

(72) Inventors: Youngjae Kim, Seoul (KR); Junghee Lee, San Antonio, TX (US); Jin Woo Ahn, Seoul (KR); Donggyu Park, Seoul (KR); Sung-Yong Park, Seoul (KR)

(73) Assignee: SOGANG UNIVERSITY RESEARCH FOUNDATION, Seoul (KR)

(*) Notice: Subject to any disclaimer, the term of this patent is extended or adjusted under 35 U.S.C. 154(b) by 248 days.

(21) Appl. No.: 16/051,591

(22) Filed: Aug. 1, 2018

(65) Prior Publication Data
US 2020/0042731 A1 Feb. 6, 2020

(51) Int. Cl.
*G06F 21/00* (2013.01)
*H04L 29/06* (2006.01)
(Continued)

(52) U.S. Cl.
CPC ...... *G06F 21/6218* (2013.01); *G06F 12/1458* (2013.01); *G06F 21/10* (2013.01);
(Continued)

(58) Field of Classification Search
CPC .... G06F 21/6218; G06F 21/10; G06F 21/604; G06F 12/1458; G06F 21/602;
(Continued)

(56) References Cited

U.S. PATENT DOCUMENTS 9,875,597 B2 * 1/2018 Warkentin .............. G07F 17/32
10,387,399 B1 * 8/2019 McKelvie ........... G06F 16/2358
(Continued)

FOREIGN PATENT DOCUMENTS

KR 10-2018-0032409 3/2018

OTHER PUBLICATIONS

Jinwoo Ahn et al., "KEY-SSD: Access-Control Drive to Protect Files from Ransomware Attacks", Technical Report, Department of Computer Science and Engineering, Sogang University, 2018.

*Primary Examiner* — Lisa C Lewis
(74) *Attorney, Agent, or Firm* — Lex IP Meister, PLLC

(57) ABSTRACT

Disclosed is a system for controlling access of one or more applications to a storage device, including: a storage device including one or more memories; and a kernel implemented between the applications and the storage device, in which when the kernel receives a first access request to the storage device from a first application, the kernel transmits to the storage device first memory address information to be accessed by the first application and a first access code included in the first access request, and the storage device stores a database for an authorized access code for each memory address information and controls the first application to access a memory corresponding to the first memory address information according to whether the first memory address information and the first access code are present in the database.

7 Claims, 6 Drawing Sheets

(51) Int. Cl.
*G06F 21/62* (2013.01)
*G06F 21/10* (2013.01)
*G06F 21/60* (2013.01)
*G06F 12/14* (2006.01)

(52) U.S. Cl.
CPC .......... *G06F 21/602* (2013.01); *G06F 21/604* (2013.01); *G06F 2221/2141* (2013.01)

(58) Field of Classification Search
CPC ............... G06F 2221/2141; G06F 3/06; G06F 2212/1052; G06F 12/1483
See application file for complete search history.

(56) References Cited

U.S. PATENT DOCUMENTS

| | | | |
|---|---|---|---|
| 2001/0049705 A1* | 12/2001 | Murase | G06F 40/166 715/255 |
| 2012/0284786 A1* | 11/2012 | Somani | H04L 63/0815 726/7 |
| 2013/0347073 A1* | 12/2013 | Bryksa | H04W 12/0804 726/4 |
| 2014/0181454 A1* | 6/2014 | Manula | G06F 12/1475 711/170 |
| 2016/0154590 A1* | 6/2016 | Fan | G06F 3/0611 711/118 |
| 2016/0350260 A1* | 12/2016 | Tsirkin | G06F 9/45558 |
| 2018/0025171 A1* | 1/2018 | Shan | G06F 21/44 726/18 |
| 2020/0021448 A1* | 1/2020 | Chumbley | H04L 9/0894 |

* cited by examiner

METHOD FOR BLOCKING ACCESS OF MALICIOUS APPLICATION AND STORAGE DEVICE IMPLEMENTING THE SAME

BACKGROUND

Field

Methods and apparatuses consistent with exemplary embodiments broadly relate to a method for blocking a malicious application and a storage device implementing the same.

Description of Related Art

In recent years, an attempt has increased to unauthorized access to a file of a user, which is stored in a storage device to damage the file and performed by illegally installing a malicious application on a computer of the user without permission of the user and executing the installed malicious application.

In response to the attempt, development of a security system or a security application has been continuously carried out. However, existing technologies have monitored behavior patterns (increasing frequency of file name changes, continuous calling of an encryption function library, etc.) of a malicious program in order to detect or prevent the application program or restored the file from a precreated backup copy when the files are infected.

However, as the malicious program evolves, the technologies can be easily avoided, and a data backup technology requires additional storage space and backed up data can also be infected by the malicious program.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a technology for blocking an unauthorized malicious application before accessing a memory by implementing an access control mechanism before accessing the memory in a storage device.

An exemplary embodiment provides a system for controlling access of one or more applications to a storage device. The system for controlling access of one or more applications to a storage device includes a storage device including one or more memories, and a kernel implemented between the applications and the storage device, wherein when the kernel receives a first access request to the storage device from a first application, the kernel transmits to the storage device first memory address information to be accessed by the first application and a first access code included in the first access request, and wherein the storage device stores a database for an authorized access code for each memory address information and controls the first application to access a memory corresponding to the first memory address information according to whether the first memory address information and the first access code are present in the database.

The storage device maps the first access code to the first memory address information and stores the first access code in the database when the first access code is not present.

The kernel stores information obtained by mapping the first memory address information and the first access code when processing for the first access request is delayed and deletes the information when the first application accesses the memory corresponding to the first memory address information.

When the kernel receives a second access request to the storage device from a second application, the kernel transmits to the storage device second memory address information to be accessed by the second application and a second access code included in the second access request, and wherein the storage device retrieves whether the second access code is present in the database, retrieves third memory address information corresponding to the second access code in the database when the second access code is retrieved, and controls the second application to access the memory corresponding to the second memory address information according to whether the second memory address information and the third memory address information match each other.

The method for controlling access of an application includes storing a database for an authorized access code for each memory address information, retrieving an access code included in the access request in the database when an access request to a file stored in a specific memory from the application, retrieving memory address information corresponding to the access code in the database when the access code is retrieved in the database, and comparing whether the memory address information of the specific memory included in the access request and memory information extracted with the access code in the database and controlling the application to access the file stored in the specific memory according to matching.

The method for controlling access of an application further includes allowing the application to access the file stored in the specific memory when the access code is not retrieved.

The method for controlling access of an application further includes mapping the access code included in the access request to the memory address information corresponding to the specific memory and storing the access code in the database when the specific memory is a memory requiring access control.

When the access code is retrieved in the database, the access code is information included in a first access request of the application.

According to exemplary embodiments of the present invention, since even access of an unauthorized application is denied, a malicious application can be completely blocked.

Further, according to exemplary embodiments of the present invention, an access control mechanism is performed in a storage device, and as a result, a malicious application bypassing the access control mechanism performed in a file system can be blocked.

BRIEF DESCRIPTION OF THE DRAWINGS

The above and other aspects, features, and advantages of various exemplary embodiments of the present disclosure will be more apparent from the following description taken in conjunction with the accompanying drawings, in which.

DETAILED DESCRIPTION OF EXEMPLARY EMBODIMENTS

Figure 1:
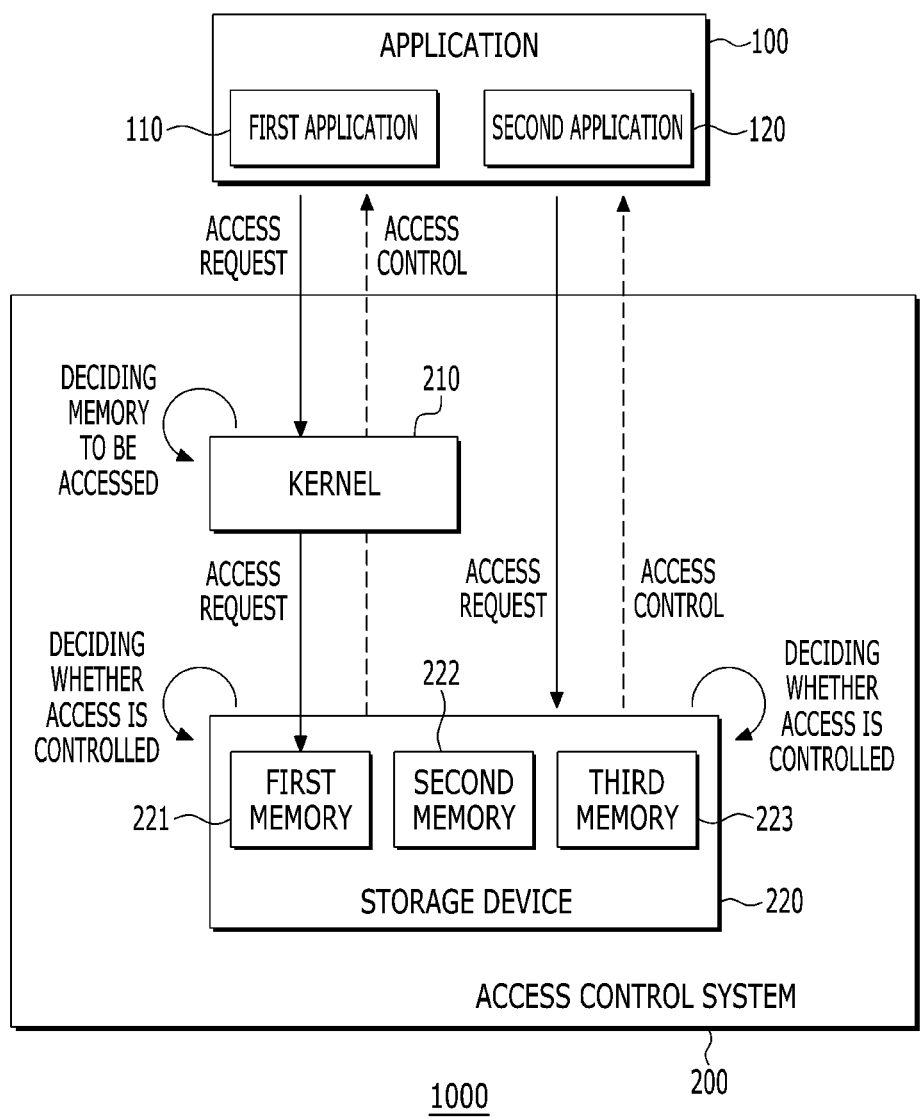
FIG. 1 is a diagram for describing an environment in which a system for controlling an access of an application to a storage device is implemented and a structure of the system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

FIG. 1 is a diagram for describing an environment in which a system for controlling an access of an application to a storage device is implemented and a structure of the system according to an exemplary embodiment of the present invention.

Referring to FIG. 1, an environment 1000 in which a system is implemented includes an application 100 and an access control system 200.

The application 100 includes a first application 110 and a second application 120 and the applications 110 and 120 request system resources to perform a purpose assigned to each application. In the present invention, it is assumed that the applications 110 and 120 request access to a memory resource included in a storage device 220 in order to write data to the storage device 220 or read data written to in the storage device 220.

When the application 100 requests access to the storage device 220, the application 100 may request access to the storage device 220 through a kernel 210 or directly request the access to the storage device 220 by bypassing the kernel 210.

For example, the first application 110 may transmit a connection request to the storage device to the kernel 210 in order to access the storage device 220 and the kernel 210 that receives the access request may decide a memory which the first application 110 is to access in the storage device 220 and transmit memory address information to the storage device 220 so that the first application 110 accesses the decided memory.

Further, for example, the second application 120 may directly transmit the access request to the storage device 220 by bypassing the kernel 210 and in this case, the access request includes memory address information which the second application 120 is to access.

The access control system 200 includes the kernel 210 and the storage device 220 and the access control system 200 receives an access request to a file stored in a specific memory from the application 100 and controls the access of the application 100 according to whether an access code included in the access request matches an authorized access code corresponding to a specific memory to be accessed.

The kernel 210 is implemented between the application 100 and the storage 220 and upon receiving the access request to the storage 220 from the application 100, the kernel 210 decides the memory address information which the application 100 is to access and transmits the decided memory address information and the access code included in the access request to the storage device 220.

The storage device 220 includes one or more memories 221 to 223 and stores a database of an authorized access code for each memory address information and decides the authorized access code corresponding to the memory address information received from the kernel 210 or directly received from the application 100. Thereafter, the storage device 220 determines whether the received access code is present in the database and when the received access code is present in the database, the storage device 220 allows the application 100 to access the memory corresponding to the memory address information, but when the received access code is not present in the database, the storage device 220 blocks the access of the application 100.

The storage device 220 may refer to a device that temporarily or permanently stores data in the memories 221 to 223. In particular, the storage device 220 may be a solid-state drive (SSD).

According to the present invention, since an unauthorized application is even denied access to the memory, the malicious application may be completely blocked and the access control mechanism is performed in the storage device 220, and as a result, even the application for bypassing the kernel 210 may be blocked.

Hereinafter, a method in which the access control system controls access to the storage device of the application according to an exemplary embodiment will be described with reference to FIGS. 2 to 4.

Figure 2:
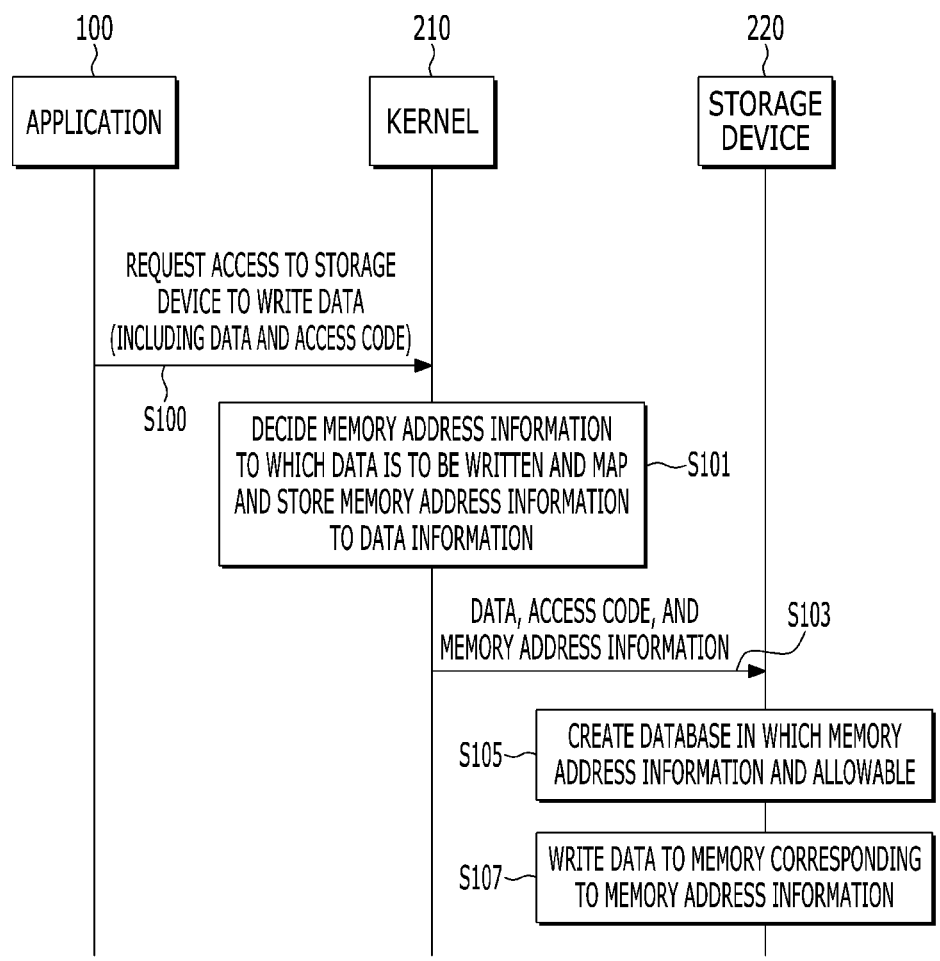
FIG. 2 is a diagram for describing an operation of the access control system when the application requests an initial access to the storage device.

FIG. 2 is a diagram for describing an operation of the access control system when the application requests an initial access to the storage device.

Referring to FIG. 2, the application 100 transmits to the kernel 210 the access request to the storage device 220 (S100). In step S100, it is assumed that the application 100 first transmits the access request to write data to the storage device 220. Thus, the access request transmitted by the application 100 includes data to be written to the storage device 220.

Meanwhile, when the application accesses the storage device 220 through the kernel 210 using a system call, the application decides the access code for the file to be accessed and inserts the decided access code as a parameter of the system call and transmits the access code to the storage device 220 through the kernel 210. That is, in the present invention, it is premised that when the application 100 accesses the storage device 220 through the kernel 210 using the system call, the access request transmitted by the application 100 includes the access code. Accordingly, when the application 100 requests the access to the storage device 220 through the kernel 210 as in step S100, the access request transmitted by the application 100 includes the access code.

Upon receiving the access request from the application 100, the kernel 210 decides the memory address information in the storage device 220 to which the application 100 will write the data, and maps the decided memory address information to the corresponding data information and stores the memory address information mapped with the data information (S101).

For example, the kernel 210 may use an Mode to manage a data structure for data in the storage device 220, which may include data information and physical address information written in the storage device 220. Accordingly, the kernel 210 generates the Mode for the data received from the application 100, thereby mapping and storing the memory address information to which the data is to be written and the corresponding data information.

Although not illustrated in FIG. 2, after step S101, the kernel 210 may store information obtained by mapping the decided memory address and the access code included in the received access request.

The reason is that when the kernel 210 receives the access request from the application 100 and thereafter, multiple system calls are generated and the corresponding access request may not be processed immediately, so that the processing is delayed, there is a problem that the decided memory address information and access code may not be simultaneously transmitted to the storage device 220. Accordingly, after storing the information obtained by mapping the memory address information and the access code, the kernel 210 may decide the access code mapped to correspond to the memory address information decided at the time of processing the access request and transmit the corresponding access code to the storage device 220 together with the memory address information and the corresponding information may be deleted in order to protect information on the access code and minimize space overhead after terminating the access to the storage device 220.

The kernel 210 transmits the data, the access code, and the memory address information received from the application 100 to the storage device 220 (S103).

In the case of FIG. 2, since the application 100 first transmits the access request to write the data to the storage device 220, there is no authorized access code corresponding to the memory address information in the storage device 220. Accordingly, the storage device 220 generates a database by mapping the access code received from the kernel 210 with the decided memory address information (S105).

Herein, the database refers to a set of data that stores the memory address information and authorized access codes corresponding thereto, respectively, using a data structure such as a table, a linked list, or a tree.

For example, the storage device 220 may generate a table type database by mapping an authorized access code "0x000033" to memory address information "LPN: 0, PPN: 7", mapping authorized access code "0x000018" to memory address information "LPN: 2, PPN: 3", and mapping an authorized access code "0x000027" to memory address information "LPN: 4, PPN: 1" and may not store the authorized access code because the authorized access codes are not mapped to memory address information "LPN: 1, PPN: 10" and "LPN: 3, PPN: 15" in which no data is written.

TABLE 1

| LPN | PPN | KEY |
| --- | --- | --- |
| 0 | 7 | 0x000033 |
| 1 | 10 | NULL |
| 2 | 3 | 0x000018 |
| 3 | 15 | NULL |
| 4 | 1 | 0x000027 |

Meanwhile, a table as shown in Table 1 is linearly configured and has an advantage that implementation is simple and a time required for retrieving the authorized access code to access the memory is relatively short. However, since the authorized access code is unconditionally stored in the storage device 220 for a memory that does not need to be protected, there is a disadvantage that overhead that occupies a large amount of memory space in the storage device 220 may occur.

Accordingly, the storage device 220 manages the memory address information in which data is to be written using a table composed of LPN and PPN in the same manner as Table 1, but may add a field to map the authorized access code only to the memory address information that needs to be protected and specify an authorized access code unique to the memory address information.

For example, when access control is required for the memory address information "LPN: 0, PPN: 7" among the entire memory address information as shown in Table 2 below, the storage device 220 may map and store the authorized access code "0x000033" only to the corresponding memory address information. The memory address information requiring the access control may be decided by a user and the storage device 220 may store a table indicating whether the access control is required for each memory address information in order to check whether specific memory address information is memory address information requiring the access control.

TABLE 2

| LPN | PPN | Whether access control is required | KEY |
| --- | --- | --- | --- |
| 0 | 7 | Y | 0x000033 |
| 1 | 10 | N | — |
| 2 | 3 | N | — |
| 3 | 15 | N | — |
| 4 | 1 | N | — |

The storage device 220 may reduce the overhead in the storage device 220 due to the memory space by creating the table in the manner shown in Table 2. The information included in the item of "Whether access control is required" in table 2 occupies a small amount of memory space (1 bit) in the storage device 220, and thus the information does not affect the overhead.

The storage device 220 writes the data to the memory corresponding to the memory address information received from the kernel (S107).

By repeating the steps, the kernel 210 may map data information for the data received by the application 100 to the memory address information to which the corresponding data is to be written and store the data information mapped with the memory address information in the database.

Figure 3:
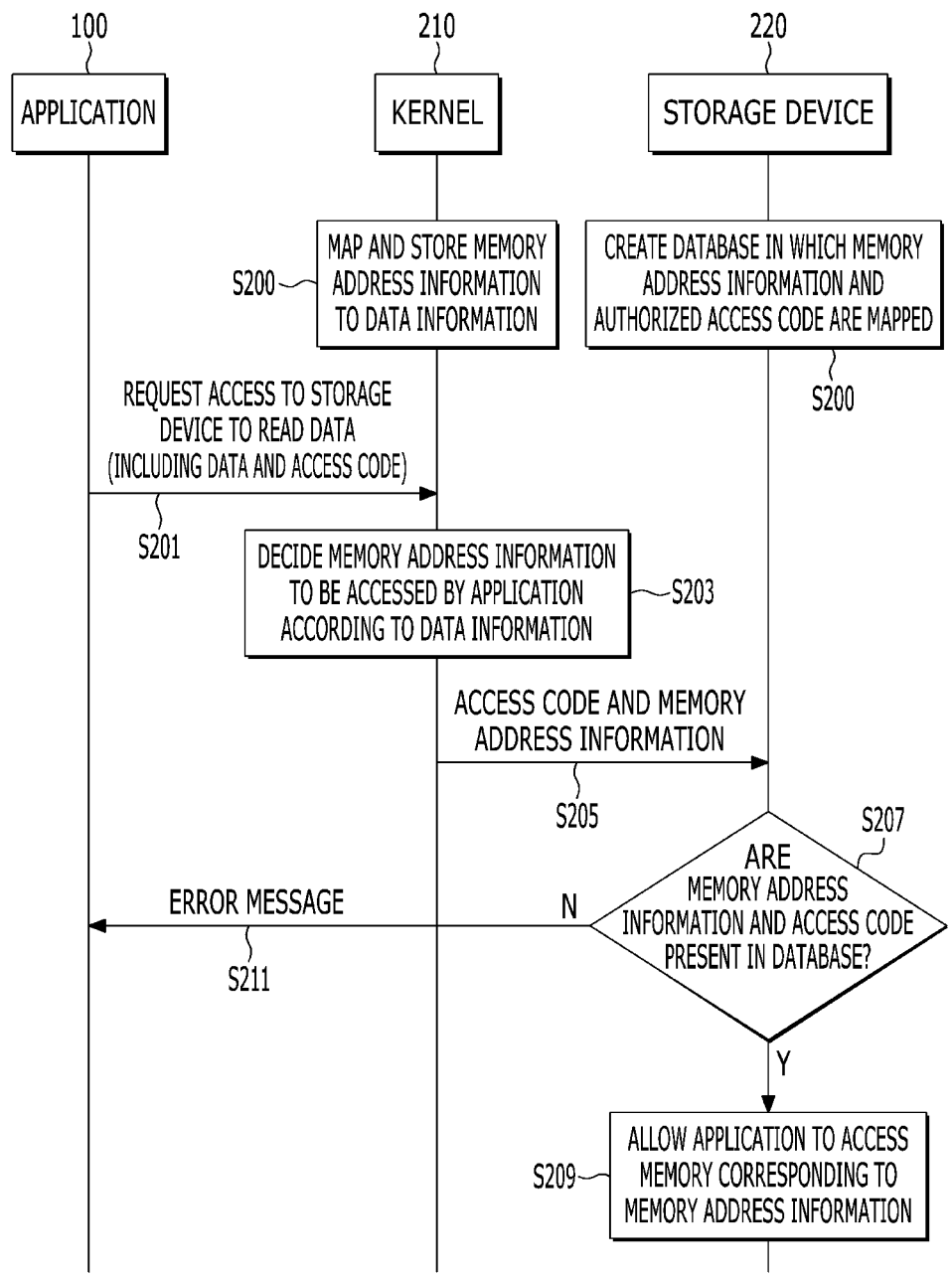
FIG. 3 is a diagram for a method in which an access control system controls an application that accesses a storage device through a kernel according to an exemplary embodiment of the present invention.
Figure 4:
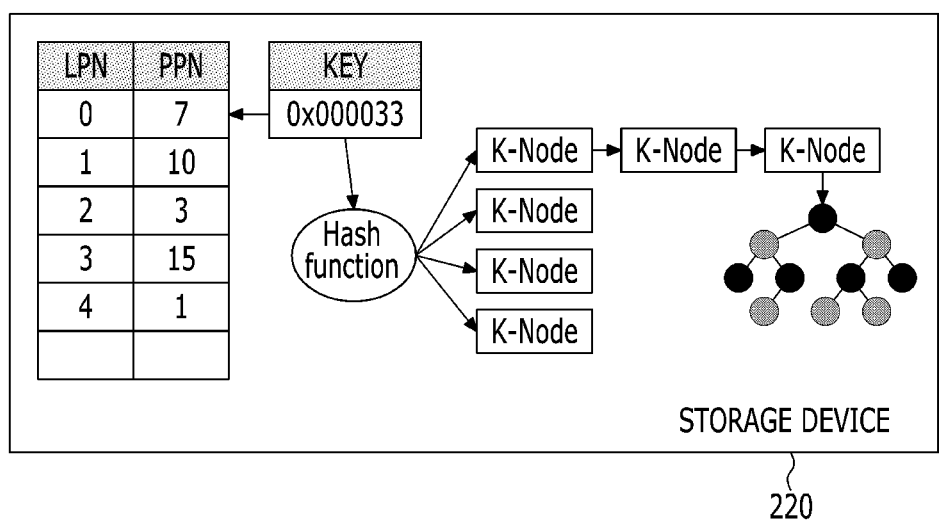
FIG. 4 is a diagram for describing a method in which the storage device controls the access of the application by using a database according to an exemplary embodiment of the present invention.

FIG. 3 is a diagram for a method in which an access control system controls an application that accesses a storage device through a kernel according to an exemplary embodiment of the present invention and FIG. 4 is a diagram for describing a method in which the storage device controls the access of the application by using a database according to an exemplary embodiment of the present invention.

Referring to FIG. 3, the kernel 210 maps and stores the data information and the memory address information through the process illustrated in FIG. 2 and the storage device 220 generates the database for the authorized access code for each memory address information (S200) and thereafter, the application 100 transmits the access request to the storage device 220 to the kernel 210 (S201). In this case, it is assumed that the application 100 transmits the access request to read the data written to the storage device 220 and thus, the access request includes the data information to which the application 100 requests the access. Further, since the access request represents a case where the application 100 requests the access to the storage device 220 through the kernel 210, the access request includes the access code generated by the system call.

Upon receiving the access request from the application 100, the kernel 210 decides the memory address information to be accessed by the application 100 according to the data information included in the access request (S203).

For example, as described with reference to FIG. 2, the kernel 210 may manage the data structure of the data in the storage device 220 using the Mode. Therefore, the kernel 210 retrieves the received data information on the Mode to decide the memory address information in which the data corresponding information is written and decide the decided memory address information as the memory address information to be accessed by the application 100.

The kernel 210 transmits the decided memory address information and the access code included in the received access request to the storage device 220 (S205). The storage device 220 decides whether the memory address information and the access code received from the kernel 210 are present in the database (S207) and when the memory address information and the access code are present in the database, the storage device 220 allows the application 100 to access the memory corresponding to the memory address information (S209) and when the memory address information and the access code are not present in the database, the storage device 220 blocks the access of the application 100 and transmits an error message to the application 100 (S211).

In an exemplary embodiment, the storage device 220 creates the mapping table as shown in Table 1, and the kernel 210 transmits the memory address information "LPN: 0, PPN: 7" and the access code "0x000033" to the storage device 220 by a data read and access request of a first application, and the kernel 210 transmits the memory address information "LPN: 2, PPN: 3" and the access code "0xFFFFFF" to the storage device 220 by a data read and access request of a second application, since the authorized access code and the access code corresponding to the memory address information match each other in the case of the first application, the storage device 220 allows the first application to access the memory corresponding to the memory address information, but since in the case of the second application, the authorized access code and the access code corresponding to the memory address information does not match each other, the storage device 220 blocks the second application.

In another exemplary embodiment, when the storage device 220 creates the mapping table as shown in Table 2, the storage device 220 determines whether the memory address needs to be protected through "Whether access control is required" field in Table 2. If the field is "Y", the storage device 220 retrieves whether the access code received from the kernel 210 is present in the table, retrieves the memory address information corresponding to the access code retrieved in the table when it is retrieved that the received access code is present in the table, controls the access to the memory corresponding to the memory address information received by the application according to whether the retrieved memory address information and the memory address information received from the kernel 210 match each other.

In this case, the storage device 220 applies a hashing algorithm to the access code received through the kernel 210 to retrieve whether the authorized access code which is identical to the access code is present in the database, as shown in FIG. 4 in order to effectively retrieve the authorized access code and the memory address information and when the authorized access code is present in the database, the storage device 220 applies a red-black tree algorithm to the authorized access code to retrieve the memory address information corresponding to the authorized access code.

Thereafter, the storage device 220 allows the access to the memory corresponding to the memory address information of the application 100 when the retrieved memory address information is the same as the memory address information received through the kernel 210.

However, the storage device 220 does not allow the access to the memory corresponding to the memory address information of the application 100 when the corresponding access code is not retrieved.

If the field is "N", a case where the memory corresponding to the memory address information received through the kernel 210 is the memory which needs to be protected is a case the application 100 first requests the access. In this case, the received access code is mapped to the memory address information to be stored in the database, and the access of the application 100 is allowed. When the memory corresponding to the memory address information received through the kernel 210 is the memory which need not be protected, the access of the application 100 is allowed without mapping and storing the access code and the memory address information.

When the access code is present in the database, but the memory address information corresponding to the authorized access code is different from the memory address information received through the kernel 210, the application 100 requests the access to the memory which needs to be protected with an inappropriate access code, and as a result, the access of the application 100 is blocked and the error message is transmitted to the application 100.

Meanwhile, before step S203, similarly as in FIG. 2, the kernel 210 may create the database in which the decided memory address information and the access code included in the received access request are mapped and the database may be deleted in order to protect the information on the access code and minimize the space overhead after the application 100 terminates the access to the storage device 220.

Figure 5:
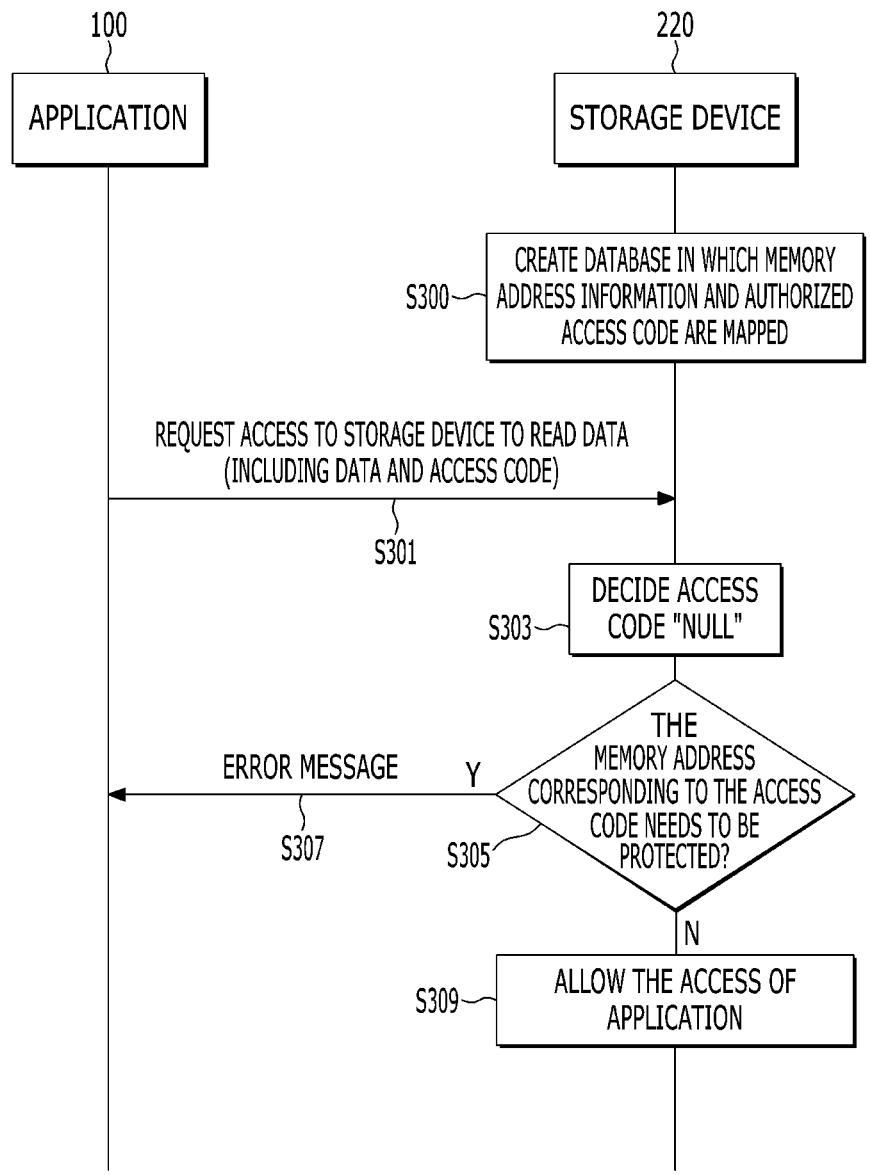
FIG. 5 is a diagram for a method in which the access control system controls the application that directly accesses the storage device without passing through the kernel according to an exemplary embodiment of the present invention.

FIG. 5 is a diagram for a method in which the access control system controls the application that directly accesses the storage device without passing through the kernel according to an exemplary embodiment of the present invention.

Referring to FIG. 5, the storage device 220 creates the database for the authorized access code for each memory address information through the process illustrated in FIG. 2 (S300) and thereafter, the application 100 directly transmits the access request to the storage device 220 (S301). In this case, it is assumed that the application 100 transmits the access request to read the data written to the storage device 220 and the access request transmitted by the application 100 includes the memory address information to be accessed by the application 100, but the access to the storage device 220 is not requested through the kernel 210 by using the system call, and as a result, the access request does not include the access code.

When the access request received from the application 100 does not include the access code, the storage device 220 decides the access code as "NULL" (S303), decides whether the memory address corresponding the access code needs to be protected (S305). If the memory address corresponding the access code needs to be protected, the storage device 220 blocks the access of the application 100 and transmits the error message to the application 100 (S307). If the memory address corresponding the access code does not need to be protected, the storage device 220 allows the access of the application 100 (S309).

Figure 6:
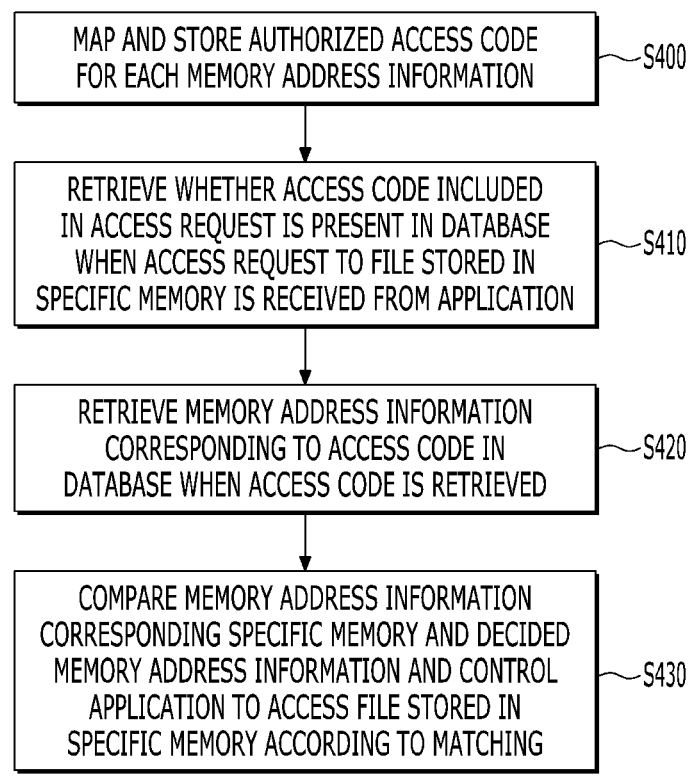
FIG. 6 is a diagram for describing a method in which the storage device controls the access of the application according to an exemplary embodiment of the present invention.

FIG. 6 is a diagram for describing a method in which the storage device controls the access of the application according to an exemplary embodiment of the present invention.

Referring to FIG. 6, the storage device 220 maps and stores the authorized access code for each memory address information (S400).

Specifically, when the storage device 220 first receives from the application the access request to a specific memory in the storage device 220, the access device 220 stores the access code included in the first access request as the authorized access code for the memory address information corresponding to the specific memory and maps and stores the memory address information and the decided authorized access code.

Upon receiving the access request to a file stored in a specific memory from the application, the storage device 220 retrieves whether the access code included in the access request is present in the database (S410).

Specifically, the storage device 220 stores the database in which the authorized access code is mapped for each memory address information and thus, the storage device 220 retrieves whether the access code is present in the database by applying the hashing algorithm to the access code.

When the access code is not retrieved, the storage device 220 first allows the application to access the file stored in the specific memory.

That is, since the case where the access code is not retrieved is the case where the application first accesses the specific memory or the case where the memory corresponding to the memory address information is the memory which need not be protected, the storage device 220 allows the application to access the file stored in the specific memory.

Further, the storage device maps the access code included in the access request to the memory address information corresponding to the specific memory and stores the access code in the database only when the specific memory is a memory requiring access control.

When the access code is retrieved, the storage device 220 retrieves the memory address information corresponding to the access code in the database (S420).

Specifically, the storage device 220 applies a binary search tree to the access code to decide the memory address information stored while being mapped to the access code and in particular, may decide the memory address information by applying the red-black tree algorithm in the binary search tree.

The storage device 220 compares the memory address information corresponding to the specific memory with the decided memory address information and controls the application to access the file stored in the specific memory according to the match between both memory address information (S430).

Specifically, the storage device 220 allows access to the application when the memory address information corresponding to the specific memory matches the decided memory address information, but since the case where both memory address information does not match is the case where the application 100 requests the access to the memory which needs to be protected with the inappropriate access code, the storage device 220 blocks the access of the application 100.

According to the present invention, since even access of an unauthorized application is denied, the malicious application can be completely blocked.

Further, according to the present invention, the access control mechanism is performed in the storage device, and as a result, the malicious application bypassing the access control mechanism performed in a file system can be blocked.

The exemplary embodiments of the present invention described above can be implemented not through the apparatus and the method and can be implemented through a program which realizes a function corresponding to a configuration of the exemplary embodiments of the present invention or a recording medium having the program recorded therein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system comprising:
 a storage device including one or more memories, and configured to store a database in which a plurality of access codes are mapped to a plurality of pieces of memory access information, respectively; and
 a kernel implemented between one or more applications including a first application and the storage device,
 wherein when receiving a first access request and a second access request to the storage device from the first application, the kernel is configured to transmit to the storage device first memory address information to be accessed by the first application and a first access code included in the first access request, and second memory address information to be accessed by the first application and a second access code included in the second access request, and
 wherein the storage device is configured to:
  determine whether the first access code is present as one of the access codes in the database;
  map the first access code to the first memory address information and store the first access code in the database when the first access code is not present in the database and the first access request is a request for writing data;
  determine whether the second access code is present as one of the access codes in the database; and
  control access of the first application to a memory corresponding to the second memory address information based on whether the second access code matches an access code corresponding to the second memory address information among the plurality of access codes in the database when the second access code is present in the database.

2. The system of claim 1, wherein
when receiving a third access request to the storage device from a second application included in the one or more applications, the kernel is configured to transmit to the storage device third memory address information to be accessed by the second application and a third access code included in the third access request, and wherein the storage device is configured to
determine whether the second access code is present in the database,
retrieve fourth memory address information corresponding to the third access code in the database when the third access code is present, and
control access of the second application to the memory corresponding to the third memory address information when the third memory address information and the fourth memory address information match each other.

3. The system of claim 1, wherein each of a memory corresponding to the first memory address information and the memory corresponding to the second memory address information is a memory that needs to be protected.

4. The system of claim 3, wherein
when receiving a third access request to the storage device from the first application, the kernel is configured to transmit to the storage device third memory address information to be accessed by the first application and a third access code included in the third access request, and the storage device is configured to
determine whether a memory corresponding to the third memory address information needs to be protected, and
allow the first application to access the third memory address information when the memory corresponding to the third memory address information does not need to be protected, regardless of whether the third access code is present as one of the access codes in the database.

5. A method for controlling, by a storage device including one or more memories, access of an application, the method comprising:
storing a database in which a plurality of access codes are mapped to a plurality of pieces of memory address information, respectively;
when receiving a first access request to a first file stored in a specific memory from the application, determining whether a first access code included in the first access request is present in the database;
when the first access code is not present in the database the first access request is a request for writing data, mapping the first access code to first memory address information included in the first access request and store the first access code in the database;
when receiving a second access request to a second file stored in the specific memory from the application, determining whether a second access code included in the second access request is present in the database;
when the second access code is present in the database, retrieving second memory address information corresponding to the second access code from the database; and
comparing whether third memory address information of the specific memory included in the second access request and the second memory address information retrieved from the database and controlling access of the application to the second file stored in the specific memory based on whether the second memory address information and the third memory address information match each other.

6. The method of claim 5, wherein the specific memory is a memory that needs to be protected.

7. The method of claim 5, further comprising:
receiving a third access request to a third file stored in another memory from the application; and
determining whether the another memory needs to be protected; and
allowing the application to access fourth memory address information included in the third access request when the another memory does not need to be protected.

* * * * *